United States Patent [19]

Tao et al.

[11] Patent Number: 4,726,937

[45] Date of Patent: Feb. 23, 1988

[54] RECOVERY OF NICKEL CHLORIDE AND SULFUR FROM WASTE PRODUCTS

[75] Inventors: Fan-Sheng Tao; Joseph B. Mitchell, both of Paso Robles, Calif.

[73] Assignee: Texaco Inc., White Plains, N.Y.

[21] Appl. No.: 888,669

[22] Filed: Jul. 23, 1986

[51] Int. Cl.$^4$ .................... C01G 53/09; C01B 17/027
[52] U.S. Cl. .................................... 423/150; 423/38; 423/46; 423/47; 423/51; 423/138; 423/153; 423/154; 423/473; 423/563; 423/567 A; 423/571; 423/578 A
[58] Field of Search .................. 423/38, 46, 47, 51, 423/141, 153, 154, 493, 567 R, 567 A, 568, 573 R, 150, 574 L, 571, 575, 138, 150, 578 A

[56] References Cited

U.S. PATENT DOCUMENTS

| | | |
|---|---|---|
| 1,917,223 | 7/1933 | Bacon et al. ............................ 423/46 |
| 1,917,684 | 7/1933 | Bacon .................................. 423/154 |
| 1,929,502 | 10/1933 | Levy et al. ............................ 423/154 |
| 1,946,325 | 2/1934 | Levy .................................. 423/154 |
| 3,053,651 | 9/1962 | McGauley ............................ 423/150 |
| 3,085,054 | 4/1963 | Thornhill ............................ 204/113 |
| 3,306,708 | 2/1967 | Bryk et al. .......................... 423/154 |
| 3,671,197 | 6/1972 | Mascio ................................ 423/154 |
| 3,838,979 | 10/1974 | Sims .................................. 423/567 |
| 4,002,717 | 1/1977 | Sandberg et al. ...................... 423/51 |
| 4,168,217 | 9/1979 | Dalvi et al. .......................... 423/47 |
| 4,214,901 | 7/1980 | Michal et al. ........................ 423/153 |
| 4,226,617 | 10/1980 | DuPont ................................ 423/47 |
| 4,241,031 | 12/1980 | Meyer et al. .......................... 423/47 |

Primary Examiner—Helen M. S. Sneed
Assistant Examiner—Anthony McFarlane
Attorney, Agent, or Firm—Robert A. Kulason; James J. O'Loughlin; Carl Seutter

[57] ABSTRACT

Waste containing sulfur and nickel sulfide is heated to volatilize sulfur and reacted with hydrogen chloride to form nickel chloride.

10 Claims, 1 Drawing Figure

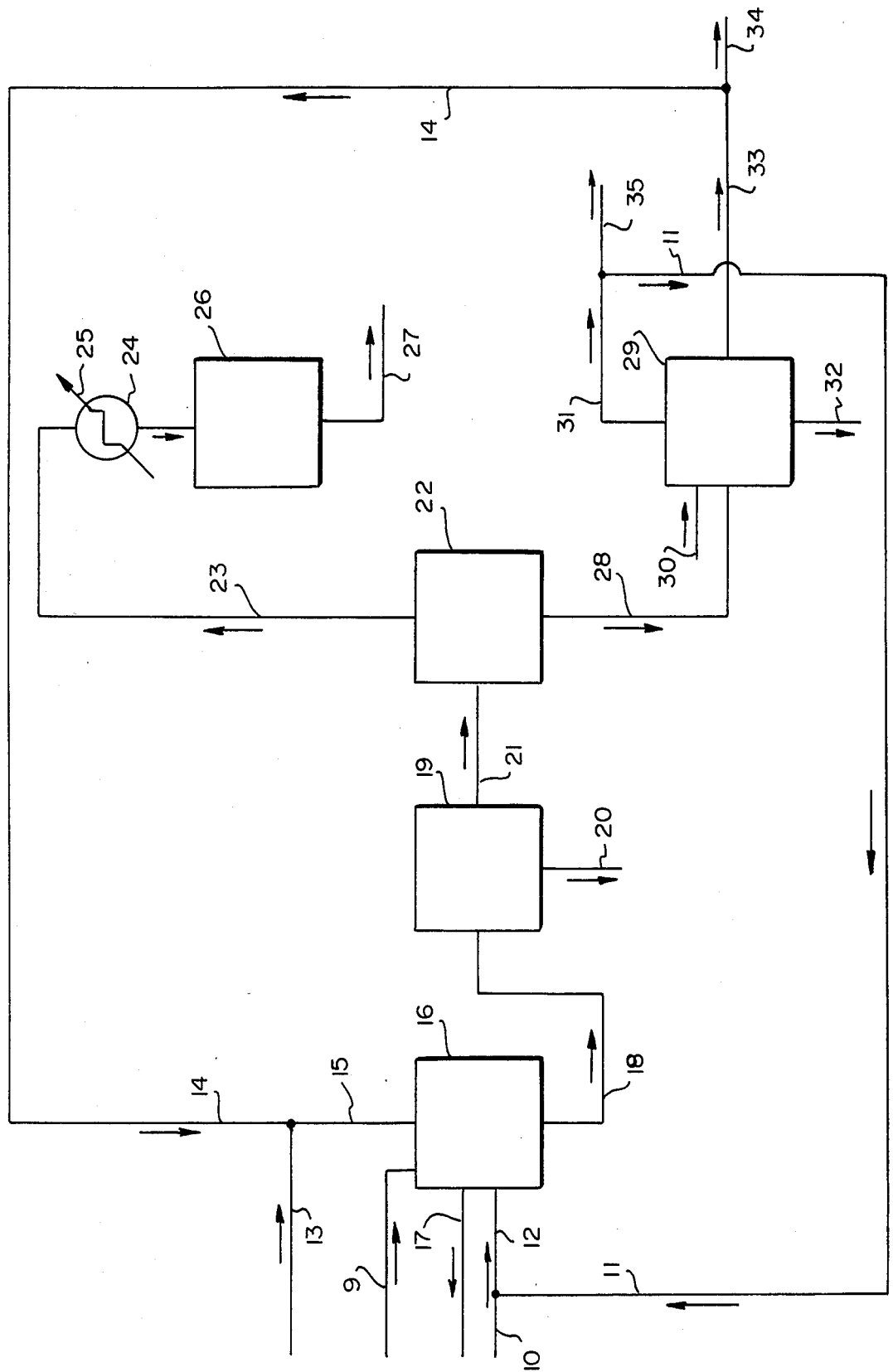

RECOVERY OF NICKEL CHLORIDE AND SULFUR FROM WASTE PRODUCTS

FIELD OF THE INVENTION

This invention relates to treatment of waste containing sulfides of transition metals, such as nickel sulfide, to convert them to soluble chlorides and to recover elemental sulfur.

BACKGROUND OF THE INVENTION

As is well known to those skilled in the art, it is possible to remove sulfides including hydrogen sulfide or mercaptans from various streams which are found in chemical plants or refineries. Illustrative of patents which disclose processes for effecting this objective are U.S. Pat. No. 3,576,738 and U.S. Pat. No. 3,932,583.

In U.S. Pat. No. 3,932,583 (the disclosure of which is incorporated herein by reference), a gas containing hydrogen sulfide and carbon dioxide is contacted with an aqueous solution typically containing sodium bicarbonate and a salt of a transition metal such as nickel chloride. During contact, the hydrogen sulfide reacts with the transition metal (which has a soluble chloride and an insoluble sulfide) typically nickel, to form nickel sulfude and sulfur in the presence of dissolved oxygen. The net aqueous mixture contains a precipitate of nickel sulfide and sulfur which may be recovered as by converting to molten sulfur.

The molten sulfur so obtained may contain (on a dry basis) typically 0.01–2.5 part, say 1.25 parts of nickel sulfide NiS and 94–100 part, say 97 parts of sulfur. Commonly there may be less than 1.75 parts of other components in the molten sulfur.

It is an object of this invention to provide a method of recovering values from this waste material. Ohter objects will be apparent to those skilled in the art.

STATEMENT OF THE INVENTION

In accordance with certain of its aspects, this invention is directed to a method of treating a composition containing elemental sulfur and an insoluble sulfide of a transition metal to recover therefrom (i) the metal in a soluble form and (ii) elemental sulfur which comprises heating said composition to a temperature above the volatilization point of sulfur thereby volatilizing sulfur and forming a residue which is substantially free of elemental sulfur;

collecting said volatilized sulfur;

recovering said collected sulfur;

acidifying said residue with an acid containing an anion which forms a water-soluble salt of said transition metal thereby forming solubilized metal salt and hydrogen sulfide;

withdrawing said hydrogen sulfide; and recovering said solubilized metal salt.

DESCRIPTION OF THE INVENTION

The charge which may be treated by the process of this invention may, in one embodiment, be a waste product typified by that recovered from the process of U.S. Pat. No. 3,932,583. It may contain 0.01–2.5 parts, say 1.25 parts of a sulfide of a transition metal typically nickel, cobalt, iron, manganese, or copper. Where the metal is capable of forming several sulfides, there may be present a mixture of these sulfides. However, because the charge is commonly formed in the presence of oxygen, the sulfide is usually that of the highest valence of the metal. For convenience the process will be described in terms of nickel which is the preferred metal; operation when the other metals are present is comparable.

The charge may contain elemental sulfur in amount of about 94–100 parts, say 97 parts and nickel sulfide in amount of 0.01–2.5 part, say 1.25 part. Other components are usually present in amount less than about 1.75 parts.

When the charge is a sludge which contains a substantial amount of water, say 233 parts per 100 part of dry sludge, it may be desirable to effect separation of water as by melting sulfur to yield a charge containing typically 0.2 parts of water. The water-containing charge may be heated to a temperature above the melting point of sulfur (118° C.) i.e. to at least about 120° C. and preferably to 120° C.–140° C., say 130° C. at a pressure which is above the vapor pressure of water whereby water present is maintained in liquid phase. Typically the pressure may be 30–100 psig, say 40 psig. Under these conditions, the sulfur forms a heavy lower liquid (containing the nickel values) and the water forms a lighter upper phase. The water may be drawn off and the liquid sulfur phase containing nickel values, may be passed to the subsequent heating vaporization operation.

The charge mixture may be heated to separate water therefrom to yield a dry molten sulfur which may commonly contain not more than about 0.2 w %, typically 0.1–0.2 w %, say 0.2 w % water.

In practice of the process of this invention, the substantially dry charge may be heated to a temperature above the volatilization point of sulfur. Heating may be effected to a temperature of at least about 120° C., preferably 120° C.–460° C., say 300° C.–400° C. It is unexpectedly found that it is not necessary to heat the charge to above the boiling point of sulfur (444.6° C.) under the preferred conditions of operation, but that sulfur starts to evaporate from the mixture at about 120° C. which is slightly above the melting point of rhombic sulfur (MP 112.8° C.) and of monoclinic sulfur (MP 119.0° C.).

The heating step is preferably carried out at anaerobic conditions, i.e. without added oxygen or air. Commonly no special provision to exclude air may be required when the heating is carried out in a closed system—preferably under vacuum of typically about 30 mm. Hg. Preferably the oxygen content of the system will be less than 0.1 v% based on total vaporized sulfur.

Heating may be carried out over 2–4 hours, say 3 hours preferably under vacuum during which time the sulfur volatilizes; and it may be condensed by cooling to 118° C.–150° C., say 125° C. at which point it is a liquid. Commonly 90–100 parts, say 92 parts of sulfur may be recovered from 100 parts of charge.

The residue from heating contains less than 10 parts of sulfur and commonly 1–10 parts, say 5 parts. In the preferred embodiment, it may consist essentially of nickel sulfide NiS of purity greater than 10 w %, say 10–60 w %, say 15.6 w %.

The residue from heating may be cooled to 15° C.–25° C. say 20° C. and there is added thereto an equivalent amount of an acid containing an anion which forms a water-soluble salt of the transision metal. Acids which may be employed, preferably in aqueous solution, include sulfuric acid, nitric acid, hydrogen bromide or preferably hydrogen chloride. Preferably hydrogen chloride is added as aqueous hydrochloric acid in amount sufficient to provide at least about 2 (say 2-2.2) moles of hydrogen chloride per mole of NiS contained in the residue. Commonly this amounts to about 2.14-3.21 parts, say 2.68 parts of 36.5 w % aqueous hydrochloric acid per 100 parts of residue.

Reaction with hydrochloric acid, preferably carried out at 15° C.-25° C., say 20° C. and atmospheric pressure over 4-8 hours, say 6 hours, converts nickel sulfide to nickel chloride and liberates hydrogen sulfide in amount typically corresponding to up to about 418 SCF per 100 pounds of nickel sulfide.

Hydrogen sulfide gas overhead and may be recovered and recycled to the inlet of a sour gas treating process.

The nickel chloride solution (commonly containing 1.43-2.15 parts, say 1.79 parts of nickel chloride per 1.7 parts of solution, or 51% by wt.) may be withdrawn and recycled as a portion of the catalyst to be employed in the process of e.g. U.S. Pat. No. 3,932,583; if desired it may be evaporated or diluted for further use.

Sludge, recovered from the hydrochloric acid treatment operation, may include unconverted nickel sulfides, etc.

DESCRIPTION OF THE DRAWING

The drawing sets forth a schematic representation of a process flow sheet according to which the process of this invention may be carried out.

DESCRIPTION OF PREFERRED EMBODIMENT

Practice of the process of this invention will be apparent to those skilled in the art from inspection of the following description of the best mode presently known of carrying out the process of this invention, wherein as elsewhere in this specification, all parts are parts by weight unless otherwise specified.

A gas mixture containing hydrogen sulfide is admitted through line 10 and joins with recycle gas containing hydrogen sulfide in line 11. The total gas stream in line 12 contains about 97 parts of hydrogen sulfide together with other gases including carbon dioxide. Aqueous treating liquor in line 15, including fresh solution from line 13 and recovered liquor from line 14, contains 1.79 parts of nickel chloride. Sodium carbonate may be admitted as through line 9.

In gas treating operation 16, the gas is contacted with the liquid in accordance with the procedure of U.S. Pat. No. 3,932,583. Off-gas recovered in line 17 contains about 3233 parts of carbon dioxide and 0.65 parts of hydrogen sulfide.

Rich liquor from operation 16 withdrawn through line 18 contains 233 parts of water, 97 parts of elemental sulfur, and 1.25 parts of nickel sulfide at 38° C. It is passed through line 18 to dehydration-separation operation 19 from which water is withdrawn through line 20.

In operation 19, the charge is heated under substantially anaerobic conditions to 350° C. at 40 psig. for 3 hours, during which time, water forms a lighter upper phase which is removed through line 20.

The molten sulfur, containing 1.25 parts of nickel sulfide and 97 parts of elemental sulfur and less than about 0.2 parts of water, is withdrawn through line 21 and passed to heating operatin 22.

In heating operation 22 in this embodiment, the molten sulfur is heated to 300° C. at ca 30 mm. Hg in a closed system i.e. a system to which outside air is not permitted to enter and which in operation may be essentially considered anaerobic.

Vapor leaving heating operation 22 through line 23 includes 92 parts of sulfur at about 250° C.; and this is condensed in a schematically shown condenser 24 against water in line 25 to yield in collection vessel 26 liquid sulfur of greater than 99 w % purity which is recovered through line 27.

Residue from heating operation 22, containing 1.25 parts of nickel sulfide of purity greater than 15 w %, is withdrawn through line 28 and passed to acidification operation 29. Here the residue, cooled to 125° C., is contacted with 2.68 parts of 36.5 w % aqueous hydrochloric acid admitted through line 30. During 3 hours, the reaction at 20° C. and atmosphere pressure liberates hydrogen sulfide (0.47 parts) which is withdrawn through line 31. A portion may be withdrawn through line 35 if desired and the remainder recycled through line 11 to line 12.

Sludge which remains at the end of the reaction is permitted to settle and withdrawn through line 32. It may be filtered if desired.

The remaining liquid, a 51 w % aqueous solution of nickel chloride, is recovered through line 33; a portion may be withdrawn through line 34 if desired and preferably the bulk of the solution may be recycled through line 14.

Although this invention has been illustrated by reference to specific embodiments, it will be apparent to those skilled in the art that various changes and modifications may be made which clearly fall within the scope of this invention.

We claim:

1. The method of treating a charge composition containing elemental sulfur and an insoluble sulfide of a transition metal to recover therefrom the metal in a soluble form and elemental sulfur which comprises
   heating said composition under essentially anaerobic conditions, to a temperature above the volatilization point of sulfur thereby volatilizing sulfur and forming a residue which is substantially free of elemental sulfur;
   separating said volatilized sulfur from said residue;
   recovering said separated sulfur;
   acidifying said residue with an acid containing an anion which forms a water-soluble salt of said transition metal thereby forming solubilized metal salt and hydrogen sulfide;
   withdrawing said hydrogen sulfide; and
   recovering said solubilized metal salt.

2. The method of claim 1 wherein said metal is mickel, cobalt, iron, manganese, or copper.

3. The method of claim 1 wherein said metal is nickel.

4. The method of claim 1 wherien said temperature is 120° C.-460° C.

5. The method of claim 1 wherein said temperature is at least as high as the melting point of sulfur.

6. The method of claim 1 wherein said acid is present as aqueous hydrochloric acid in amount substantially equivalent to said insoluble sulfide.

7. The method of claim 1 wherein said charge composition is filtered to decrease the content of water therein.

8. The method of claim 1 wherein said charge composition is heated to a temperature above the melting point of sulfur at a pressure above the vapor pressure of water whereby water present is maintained in liquid phase and water is separated prior to said volatizing operation.

9. The method of treating a charge composition containing elemental sulfur and nickel sulfide to recover therefrom elemental sulfur and nickel chloride which comprises heating said composition under essentially anaerobic conditions to 120° C.–460° C. thereby volatilizing sulfur and forming a residue which is substantially free of elemental sulfur;

separating said volatilized sulfur from said residue;

condensing said volatilized sulfur thereby forming condensed elemental sulfur;

recovering said condensed elemental sulfur;

treating said residue with hydrogen chloride thereby forming nickel chloride and hydrogen sulfide;

withdrawing said hydrogen sulfide; and recovering said nickel chloride;

10. The method of treating a charge composition containing 94–100 parts of elemental sulfur and 0.01–2.5 parts of sulfide of a transition metal including nickel, to recover therefrom the metal in water-soluble form and elemental sulfur of higher purity than is present in said charge composition which comprises heating said composition under essentially anaerobic conditions to a temperature above the volatilization temperature of about 120° C. of said sulfur and below about 400° C. thereby volatilizing sulfur and forming a residue which contains less sulfur than is present in said charge composition and said residue containing a sulfide of a transition metal including nickel;

separating said volatilized sulfur from said residue;

condensing said volatilized sulfur thereby forming condensed elemental sulfur;

recovering said condensed elemental sulfur;

treating said residue with hydrogen chloride thereby forming nickel chloride and hydrogen sulfide;

withdrawing said hydrogen sulfide; and recovering said nickel chloride.

\* \* \* \* \*